(12) United States Patent
Fiess et al.

(10) Patent No.: US 12,742,918 B2
(45) Date of Patent: Sep. 22, 2026

(54) HOLOGRAPHIC OPTICAL ELEMENT AND PRODUCTION METHOD

(71) Applicant: Robert Bosch GmbH, Stuttgart (DE)

(72) Inventors: Reinhold Fiess, Durbach (DE); Tobias Wilm, Heimsheim (DE)

(73) Assignee: Robert Bosch GmbH, Stuttgart (DE)

( * ) Notice: Subject to any disclaimer, the term of this patent is extended or adjusted under 35 U.S.C. 154(b) by 297 days.

(21) Appl. No.: 18/459,251

(22) Filed: Aug. 31, 2023

(65) Prior Publication Data

US 2024/0134103 A1 Apr. 25, 2024
US 2024/0230973 A9 Jul. 11, 2024

(30) Foreign Application Priority Data

Oct. 20, 2022 (DE) ..................... 10 2022 211 099.4

(51) Int. Cl.

| | |
|---|---|
| ***G02B 5/32*** | (2006.01) |
| ***G02B 1/00*** | (2006.01) |
| ***G02B 5/18*** | (2006.01) |
| ***G02B 26/08*** | (2006.01) |

(52) U.S. Cl.
CPC ............... *G02B 5/32* (2013.01); *G02B 1/002* (2013.01); *G02B 5/1814* (2013.01); *G02B 26/0808* (2013.01)

(58) Field of Classification Search
CPC ...... H10N 30/20; H10N 30/50; H10N 30/857; G02B 2027/0178; G02B 27/0172; G02B 27/017; G02B 2027/0127; G02B 2027/0185; G02B 27/0081; G02B 3/12; G02B 3/14; G02B 5/32; G02B 1/115; G02B 26/0808; G02B 1/002; G02B 5/1814; G02C 2202/20; G03H 1/0248; G03H 1/0272; H02N 2/04
See application file for complete search history.

(56) References Cited

U.S. PATENT DOCUMENTS 5,794,023 A * 8/1998 Hobbs .................. G02B 5/1828 359/576
10,860,101 B1 * 12/2020 Menguc .................. G06F 3/017
11,067,848 B1 * 7/2021 Ouderkirk ............ G02B 26/001
11,526,129 B1 * 12/2022 Ouderkirk ............ G03H 1/0272
(Continued)

FOREIGN PATENT DOCUMENTS

DE 102011078127 A1 8/2012
DE 102016121792 A1 5/2018
(Continued)

*Primary Examiner* — Matthew Y Lee
(74) *Attorney, Agent, or Firm* — Norton Rose Fulbright US LLP

(57) ABSTRACT

A holographic optical element (HOE). The HOE includes a hologram, and an electroactive polymer (EAP), in particular a dielectric elastomer actuator (DEA). The electroactive polymer includes at least one elastomer layer, in particular an elastomer film, arranged between two electrodes, and the hologram is applied to an electrode of the electroactive polymer. The hologram or a holographic function which can be provided by means of the hologram, and in particular diffraction properties of the hologram, can be adapted by means of a controllable deformation of the electroactive polymer. A method for producing such a holographic optical element is also described.

12 Claims, 8 Drawing Sheets

(56) References Cited

U.S. PATENT DOCUMENTS

| | | | | |
|---|---|---|---|---|
| 2002/0186928 | A1* | 12/2002 | Curtis | G02B 6/29314 359/566 |
| 2009/0310209 | A1* | 12/2009 | Aschwanden | G02B 5/1847 359/666 |
| 2011/0267680 | A1* | 11/2011 | Aschwanden | G02B 7/023 29/842 |
| 2018/0348705 | A1* | 12/2018 | Rakshit | G02B 26/004 |
| 2020/0192130 | A1* | 6/2020 | Maimone | G02B 27/0172 |
| 2020/0298488 | A1* | 9/2020 | Eisaman | B29C 64/393 |

FOREIGN PATENT DOCUMENTS

| | | | | |
|---|---|---|---|---|
| DE | 102019213098 | A1 | 3/2021 | |
| DE | 102019214841 | A1 * | 4/2021 | G03H 1/0248 |

* cited by examiner

| 14 | 12 | 14 | 12 | 14 | 12 |
|---|---|---|---|---|---|
| 12 | 14 | 12 | 14 | 12 | 14 |
| 14 | 12 | 14 | 12 | 14 | 12 |
| 12 | 14 | 12 | 14 | 12 | 14 |
| 14 | 12 | 14 | 12 | 14 | 12 |

30
32
34
36
12
28
38
14

HOLOGRAPHIC OPTICAL ELEMENT AND PRODUCTION METHOD

CROSS REFERENCE

The present application claims the benefit under 35 U.S.C. § 119 of German Patent Application No. DE 10 2022 211 099.4 filed on Oct. 20, 2022, which is expressly incorporated herein by reference in its entirety.

BACKGROUND INFORMATION

Current holograms corresponding to the related art can be used for a large number of applications. Special recording devices make it possible to produce holographic structures with optical functions and characteristics specially matched to the application. Fields of application for holographic optical elements (HOEs) are new kinds of display or sensor systems. Possible fields of application such as data glasses, or transparent display systems or fluorescence-based diagnostic systems based on holographic optics have a great potential and can be realized through the use of HOEs. The production of HOEs is based on complex, expensive and fault-prone special structures that generate recording waves in the target variable of the HOEs in order to either imprint a HOE directly or to replicate a master hologram.

The wavefront transformation carried out by HOEs and characteristic properties such as hologram bandwidth in angle and wavelength are determined by the recording configuration. During the recording process, this configuration is permanently imprinted in the structure of the holographic material in the form of a diffracting holographic grating. Once the hologram recording has been completed it is typically no longer possible to change the optical properties.

SUMMARY

One example embodiment of the present invention relates to a method for producing a holographic optical element, HOE, comprising a step of providing at least one hologram with a diffraction grating in a volume of at least one holographic film, and a step of applying the hologram to at least one electroactive polymer, EAP, in particular to a dielectric elastomer actuator, DEA, wherein the electroactive polymer comprises at least one elastomer layer, in particular an elastomer film, arranged between two electrodes, and the hologram is applied to an electrode of the electroactive polymer.

The present invention relates to a novel method for producing HOEs with adaptive optical functions. According to an example embodiment of the present invention, the combination of holograms with dielectric elastomer actuators is provided. By controlling the DEAs, namely by applying an electrical voltage, an electrostatic pressure is built up, which leads to a mechanical deformation of the elastomer film. The deformation of the elastomer film in turn makes it possible to achieve a plastic deformation of the holograms and thus a targeted, controllable change in the optical function of HOEs.

This permits, for example, the adaptation and/or variation of the characteristic parameters of the HOEs defined by the recording parameters.

In principle, HOEs can be operated in reflection and/or transmission. Suitable materials for elastomers are—depending on use, for example transmission—transparent elastomers such as, for example, silicone rubber, polyurethanes or acrylic polymers.

According to one example embodiment of the present invention, the provision of the hologram relates to the use of an already recorded hologram. The diffraction grating of the hologram in the volume of a holographic film ensures deformability. According to a further embodiment, the provision of the hologram can comprise the generation of the hologram by introducing the diffraction grating into the volume of the holographic film.

According to one example embodiment of the present invention, it is provided that at least two, in particular a plurality of, holograms are applied to at least two, in particular a plurality of, electroactive polymers, wherein the hologram and electroactive polymer are arranged in particular alternatingly, for example in the manner of a checkerboard or in a circular manner.

The present invention also relates to a holographic optical element, HOE, comprising a hologram, and an electroactive polymer, EAP, in particular a dielectric elastomer actuator, DEA, wherein the electroactive polymer comprises at least one elastomer layer, in particular an elastomer film, arranged between two electrodes, and the hologram is applied to an electrode of the electroactive polymer, and wherein the hologram or a holographic function which can be provided by means of the hologram, and in particular diffraction properties of the hologram or of the holographic function which can be provided by means of the hologram, can be adapted by means of a controllable deformation of the electroactive polymer.

For example, a playback angle and a playback wavelength of the hologram or of the holographic function that can be provided by means of the hologram can in particular be adapted.

The diffraction characteristic of volume holograms can be described with the aid of the Bragg equation:

$$2\cdot\Lambda\cdot\cos(\vartheta_K-\vartheta)=\lambda_{in}$$

The exposed volume grating is here described using the parameters $\Lambda$ and $\vartheta_K$. $\Lambda$ describes the periodic distance between the grating planes and $\vartheta_K$ describes the alignment of the volume grating where $\vartheta_K$ is the angle of the optical axis to the grating normal. $\vartheta$ describes the playback angle of an incident wavefront and $\underline{\Lambda_{in}}$ describes the playback wavelength of an incident wavefront. It is assumed here that the HOE is illuminated with light of a wavelength $\underline{\Lambda_{in}}$, which fulfills the Bragg operation.

By means of controllable deformation of the electroactive polymer, the angle, for example, $\vartheta_K$, can for example be varied by a curvature, or distance $\Lambda$, for example by stretching or compressing. In this way, the spectral diffraction properties of the hologram can be varied.

According to one example embodiment of the present invention, it is provided that the electroactive polymer comprises at least two, in particular a plurality of, independently controllable regions. By means of individual voltage-side control of individual regions, the variation of the diffraction properties of the hologram can be predefined in a more targeted and precise manner. This can also be achieved, for example, when a plurality of individual electroactive polymers are used, i.e. a hologram is applied to a plurality of electrodes of a plurality of electroactive polymers.

It can prove advantageous if a fastening device is provided on a side of the hologram opposite the electrode of the electroactive polymer, wherein the fastening device provides a counter-support against the deformation of the electroactive polymer that acts on the hologram. This can be advantageous in particular in connection with a variation of the distance A for example by stretching or compression, since a controllable deformation of the electroactive polymer due to the counter-support causes stretching or compression and for example no deformation of the hologram.

According to one example embodiment of the present invention, it is provided that at least two, in particular a plurality of, holograms are applied to at least two, in particular a plurality of, electroactive polymers, and the holograms and electroactive polymers are arranged alternatingly, for example alternatingly, for example in the manner of a checkerboard or in a circular manner, in particular centrally.

According to a further embodiment of the present invention, it is provided that the holographic optical element includes a layer stack comprising at least two, in particular a plurality of, holograms and/or at least two, in particular a plurality of, electroactive polymers which are arranged stacked. A layer stack can be advantageous in particular when the holograms are operated in transmission. For example, two or more holograms can then provide two or more mutually different functions. The electroactive polymers can be implemented and/or controlled in such a way that two or more electroactive polymers have the same mechanical effect, i.e., the same function or mutually different functions, in particular predefinable by individual control.

According to a further embodiment of the present invention, it is provided that by controlling the elastomer layer of the electroactive polymer and/or by controlling at least two, in particular a plurality of, independently controllable regions of the elastomer layer of the electroactive polymer, one or more of the following functions can be provided in the hologram of the holographic optical element: a) varying a playback angle of the holographic function of the hologram, b) varying a wavelength of the holographic function of the hologram, c) shifting a focal point of the holographic function of the hologram, d) modulating a wavefront of the holographic function of the hologram, in particular by means of a Zernike polynomial. The functions mentioned can be provided, in particular, by suitable controllable deformation of the electroactive polymer and a resulting stretching and/or compression and/or curvature and/or a combination thereof of the hologram.

A further embodiment of the present invention relates to a sensor device for detecting backscattered light, comprising at least one optical element, for example a filter element and/or a deflection element, wherein the optical element is a holographic optical element according to the described embodiments and/or comprises a holographic optical element according to the described embodiments. Advantages of such a sensor device can be found in diagnostics, in particular in the lab-on-chip field. In conventional arrangements, a plurality of HOEs, for example as, in particular sharp-edged, angle- and wavelength-selective filters, are used, in that a plurality of broadband LED signals are severely reduced in their spectrum by means of HOEs and are redirected onto a sample. By using the adaptable HOEs according to the present invention, the target configuration of the HOEs during detection can be adjusted by controlling the DEAs in such a way that the desired optical transformations that are conventionally performed by a plurality of conventional HOEs are performed by a single adaptable HOE. For example, a plurality of spectral ranges/angular configurations can be performed by a single adaptable holographic function. Multiplexing can thus be avoided.

By using an adaptive HOE, even the plurality of, for example four, narrow-band LEDs used hitherto in conventional lab-on-chip arrangements can be replaced by a single, high-performance white-light source, for example a thermal source with a blackbody spectrum. In this case, the angular configuration no longer needs to be compensated for, but only the spectral function of the hologram, depending on the fluorescence measurement performed. A further advantageous application of HOEs is in the evaluation path of a lab-on-chip system in order to separate fluorescent optical signals of a sample spatially or angularly and to deflect it onto one or more detectors.

In addition, drift effects of the LEDs, for example caused by aging or temperature effects or mechanical inaccuracies in production or in the alignment process of the optical system, in particular mechanical design of the optical path of source-HOE-sample-detector, can be compensated for or calibrated even after assembly or during the use of the complete system.

According to a further embodiment of the present invention, it is provided that the sensor device is a lidar sensor, and wherein a deflection angle and/or a wavelength and/or far-field properties of an emitted laser beam can be varied by means of the holographic optical element. In a lidar sensor, adaptable HOEs can be used, for example, as a beam-shaping unit and/or as a deflection unit, in particular in the application for automated driving. In such an application, it is particularly advantageous to be able to control the deflection angle of the laser beam two-dimensionally by means of an adaptive HOE. In addition, the target wavelength of the laser light diffracted at the hologram can be adjusted with an adaptive HOE. The HOE could thus advantageously be adapted to the relevant target wavelength of a relevant measurement cycle. Alternatively or additionally, an adaptive HOE can advantageously be used to shape the far-field properties of the emitting laser beam of the lidar.

Due to the availability of electroactive polymers with high transmission properties, the realization of adaptive HOEs in transmission is also advantageous. A HOE can be used, for example, as an adaptive lens. By way of example, an adaptive holographic lens with a variable focal length can be realized by changing the spherical contribution of the holographic target function.

According to the present invention, a further embodiment for holograms in transmission is the realization of a layer stack comprising a plurality of holograms with different functions and a plurality of DEAs. The DEAs can be implemented in such a way that they either have the same mechanical effect on all hologram layers, or this mechanical effect can be individually adapted for each hologram layer.

A further embodiment of the present invention relates to a display device, for example data glasses or a display, comprising at least one optical element, wherein the optical element is a holographic optical element according to the described embodiments and/or comprises a holographic optical element according to the described embodiments, and the holographic optical element is designed for providing a holographic function of a hologram of the holographic optical element.

According to an example embodiment of the present invention, in connection with data glasses, in particular an arrangement and control process with which the holographic function can be adapted by stretching and/or compressing the DEAs without thereby distorting the hologram is advantageous. For example, a focal point of the hologram can be shifted in this way. This application can, for example, replace a segment lens currently used in data glasses, since a plurality of virtual point sources can be generated by such a hologram. The different point sources can, for example, be used to project a plurality of eyeboxes from apparently different sources into the field of vision of the user, and thus to enlarge the overall eyebox of the user. A further application for data glasses relates to the lateral shifting of the position of a relevant eyebox on the ocular surface by means of the adaptable hologram. In this way, for example, a light beam always hits the pupil of the user of the data glasses and light can be imaged onto the retina.

According to the present invention, in connection with displays, an application of the DEAs for generating a haptic feedback in touchscreens can also be advantageous.

Further advantages can be found in the description herein and the figures. Exemplary embodiments of the present invention are illustrated in the figures and explained in more detail in the following description. Here the same reference signs in different figures in each case denote the same elements or at least elements that are comparable in terms of their function. In the description of individual figures, reference may also be made to elements from other figures.

DETAILED DESCRIPTION OF EXAMPLE EMBODIMENTS

Figure 1A:
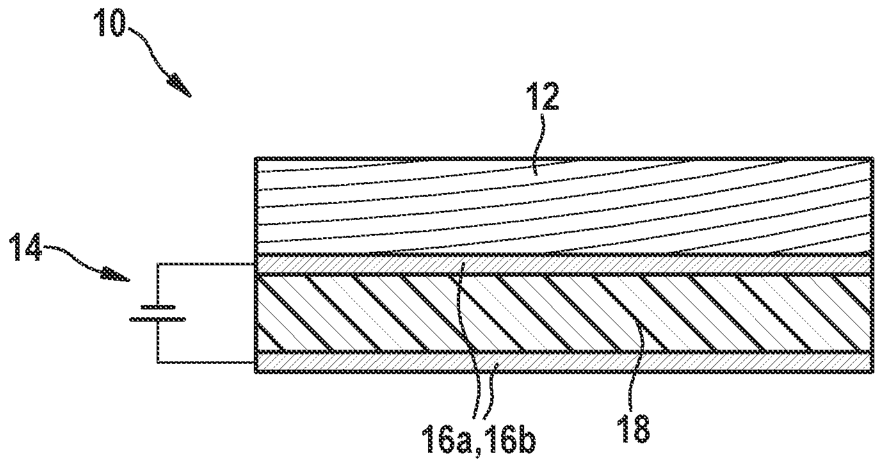
FIG. 1A to FIG. 6B show a holographic optical element according to various embodiments of the present invention.
Figure 1B:
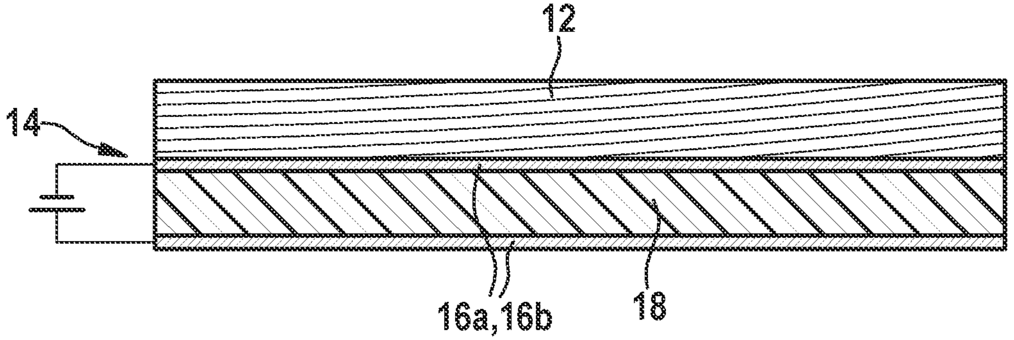

FIGS. 1A and 1B show a holographic optical element 10 in schematic form.

The holographic optical element, HOE, 10 comprises a hologram 12 which is produced by introducing a diffraction grating into a volume of a holographic film.

In the example, the hologram 12 is applied to an electroactive polymer, EAP, 14, in particular a dielectric elastomer actuator, DEA.

The electroactive polymer 14 comprises two electrodes or electrode layers 16*a*, 16*b* and an elastomer layer 18, in particular an elastomer film, arranged between the electrodes 16*a*, 16*b*.

In the electroactive polymer 14, deformation can be caused by controlling, for example by applying an electrical voltage (U>0 V). By way of example, the arrangement in FIG. 1A is at U=0 V, i.e. in the rest state, and in FIG. 1B at U>0 V, i.e. in a controlled state.

The deformation caused in the electroactive polymer 14 also leads to a mechanical deformation of the hologram 12 or of the holographic film and thus to a deformation of the diffraction grating in the holographic film. This in turn results in a change in the diffraction properties of the holographic film.

Figure 2A:
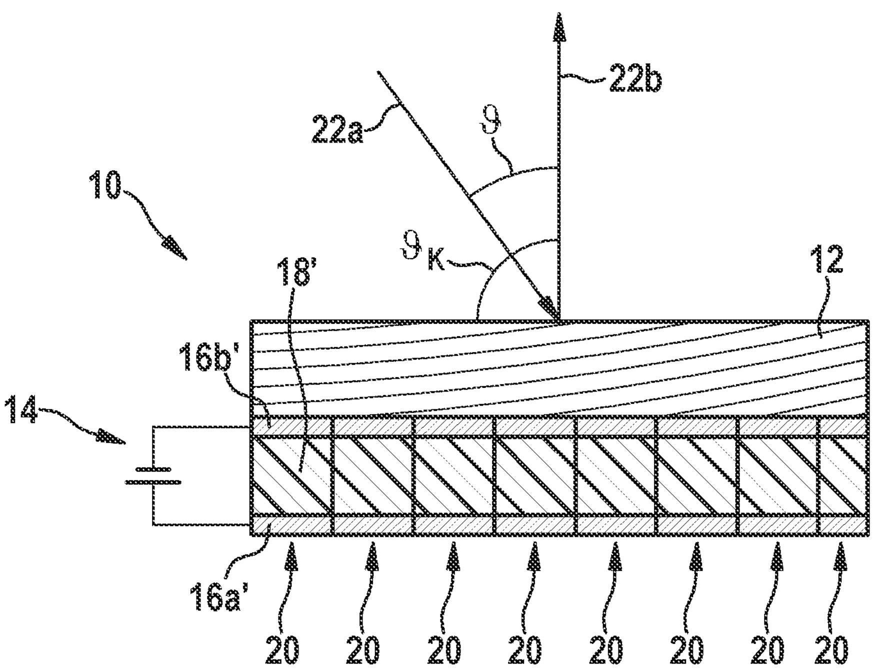
Figure 2B:
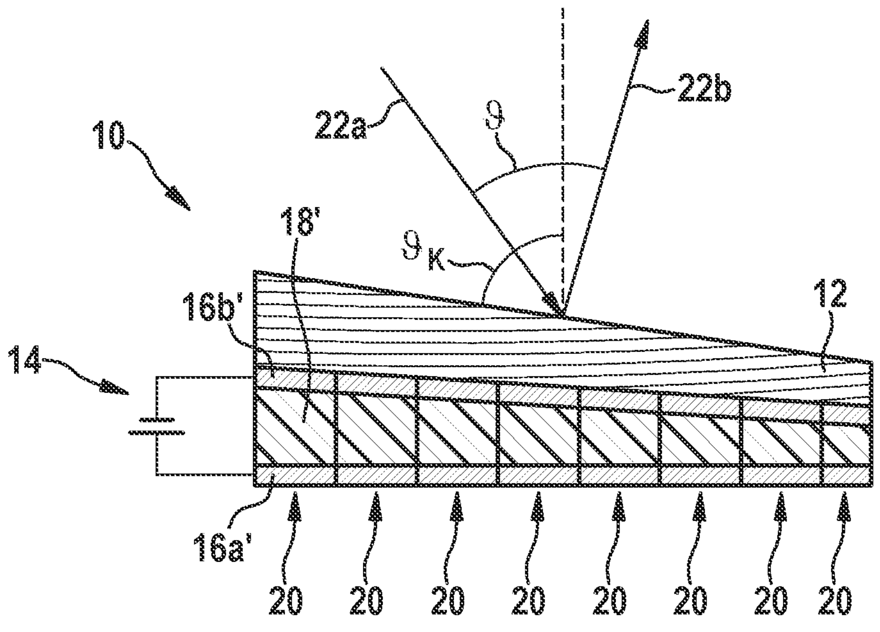

With reference to FIGS. 2A and 2B, a variation of the playback angle $\vartheta$ of the holographic function of the hologram 12 is explained by way of example.

According to FIGS. 2A and 2B, the electroactive polymer 14 comprises a plurality of regions 20 that can be controlled independently of one another. The regions 20 in each case comprise electrode sections 16*a*', 16*b*' and an elastomer layer section 18' (shown only for one region 20 in FIGS. 2A and 2B).

The regions 20 can be individually controlled via the electrode sections 16*a*', 16*b*'. This means that the deformation can be predefined individually for a particular elastomer layer section 18'.

By way of example, the arrangement in FIG. 2A is at U=0 V, i.e. in the rest state, and in FIG. 2B at U>0 V, i.e. in a controlled state.

The arrow 22*a* schematically represents a light beam of incident light. The incident light is diffracted at the diffraction grating of the hologram. In the example, the light beam 22*a* is reflected as a light beam 22*b* at a playback angle 24.

The deformation of the electroactive polymer 14 caused by way of example in a controlled manner leads to a curvature of the hologram 12 or of the holographic film and thus to a deformation of the diffraction grating in the holographic film. The curvature of the holographic film leads to an angular change of the holographic target function of the hologram due to the change in the orientation of the volume grating, where D K is the angle of the optical axis in relation to the grating normal.

This leads to a change in the playback angle 19 and thus to a change in the direction in which the reflected light beam 22*b* radiates; see FIG. 2B.

Figure 3A:
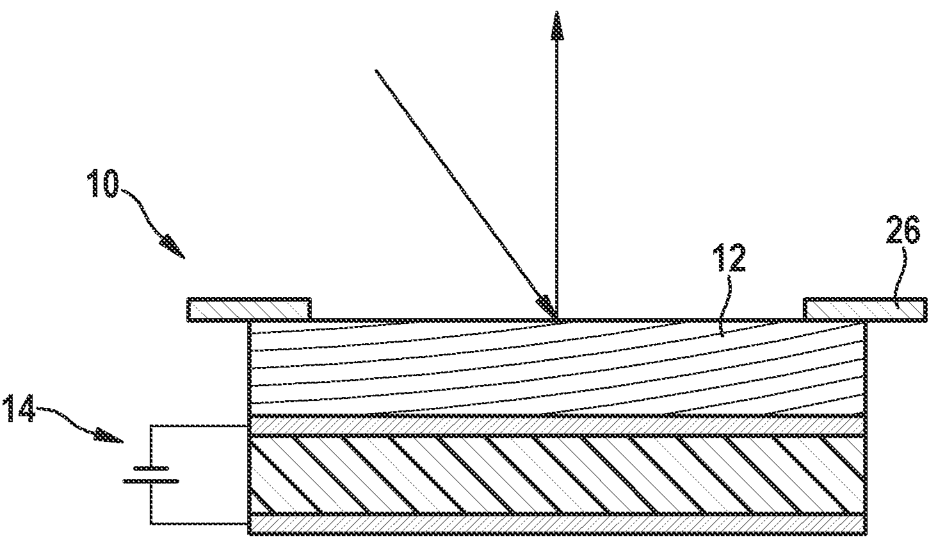
Figure 3B:
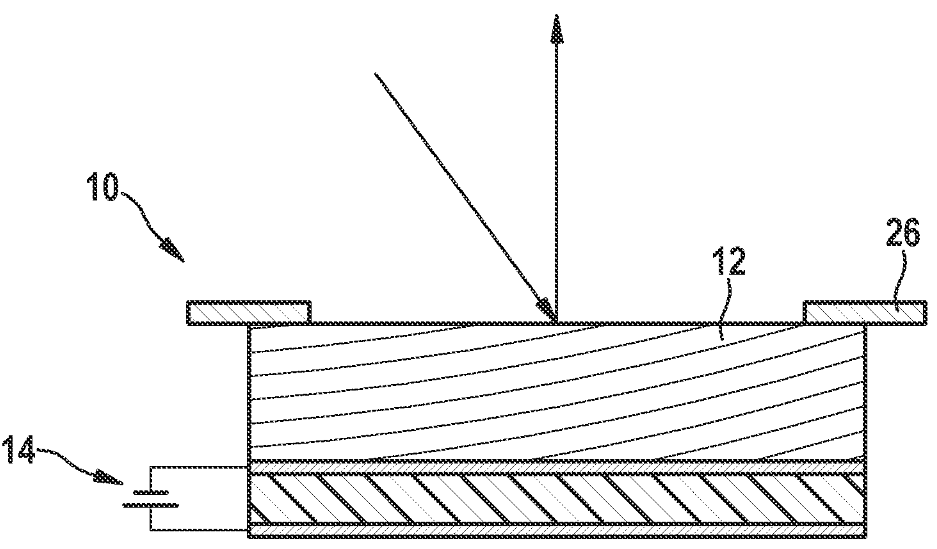

With reference to FIGS. 3A and 3B, a variation of the playback wavelength of the holographic function of the hologram 12 is explained by way of example.

By way of example, the arrangement in FIG. 3A is at U=0 V, i.e. in the rest state, and in FIG. 3B at U>0 V, i.e. in a controlled state.

In the example, the arrangement comprises a fastening device 26. The fastening device 26 is arranged on a side of the hologram opposite the electrode of the electroactive polymer 14. The fastening device 26 provides a countersupport against the deformation of the electroactive polymer 14 that acts on the hologram 12. This permits mechanical stretching or compression of the holographic film by the application of a voltage. The stretching or compression leads to a change in the grating plane distance $\Lambda$. This in turn changes the playback wavelength $\lambda_0$ of the holographic function of the hologram 12. The playback wavelength $\lambda_0$ is different in the situations shown in FIGS. 3A and 3B.

Figure 4A:
Figure 4B:
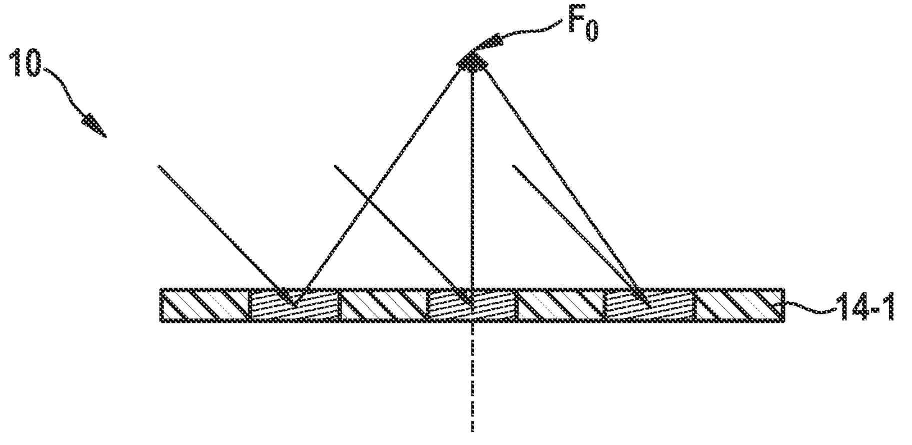
Figure 4C:
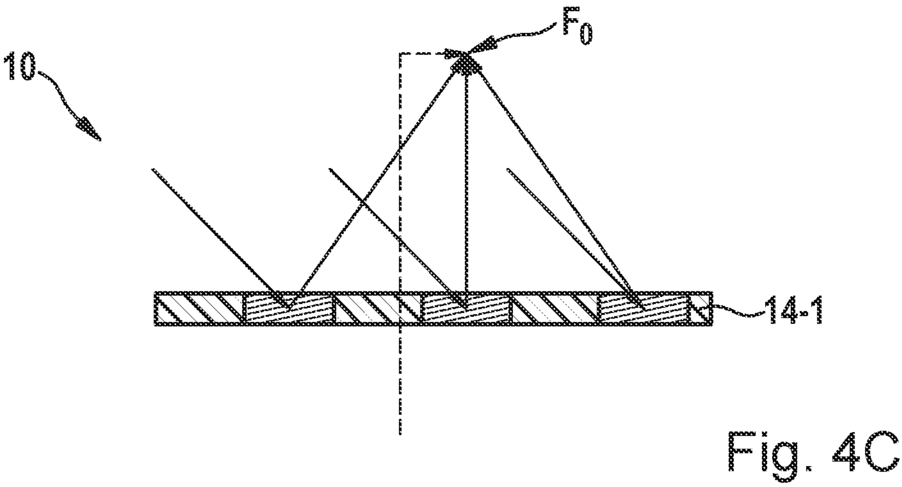

With reference to FIGS. 4A-4C, a variation of the focal point of the holographic function of the hologram 12 is explained by way of example.

In FIG. 4A, a plurality of holograms 12 or hologram sections and a plurality of electroactive polymers 14 or polymer sections are arranged alternatingly in the manner of a checkerboard. FIG. 4A is a plan view representation. By controlling the electroactive polymers 14 in particular individually, the individual holograms 12 or hologram sections 12 can be curved and/or compressed and/or stretched.

By way of example, the arrangement in FIG. 4B is at U=0 V, i.e. in the rest state, and in FIG. 4C at U>0 V, i.e. in a controlled state. FIG. 4B and FIG. 4C show a view from the side. The diffraction grating of the hologram is designed, for example, in such a way that the light beams played back by the holographic function are focused at a focal point $F_0$ of the holographic function.

By controlling the electroactive polymers 14, for example by controlling an individual polymer section 14-1, the focal point $F_0$ is shifted by the deformation. It is advantageous here to vary the holographic function, by stretching and/or compressing the electroactive polymers 14, without distorting the holograms 12 in the process. The arrangement shown in FIGS. 4A to 4C can be used, for example, as a planar-to-spherical-wave deflection hologram. Here the focal point of the hologram can be shifted laterally with the aid of the electroactive polymers 14. Such an arrangement can be used, for example, in data glasses in order to replace a segment lens in data glasses. A plurality of virtual point sources can be generated by a HOE according to FIGS. 4A-4C. The different point sources can, for example, be used to project a plurality of eyeboxes from apparently different sources into the field of vision of the user. The overall eyebox of the user can thus be enlarged.

FIGS. 5A, 5B, 6A, and 6B show arrangements with which the holographic function, or playable wavefronts, can be modulated in a complex manner.

Figure 5A:
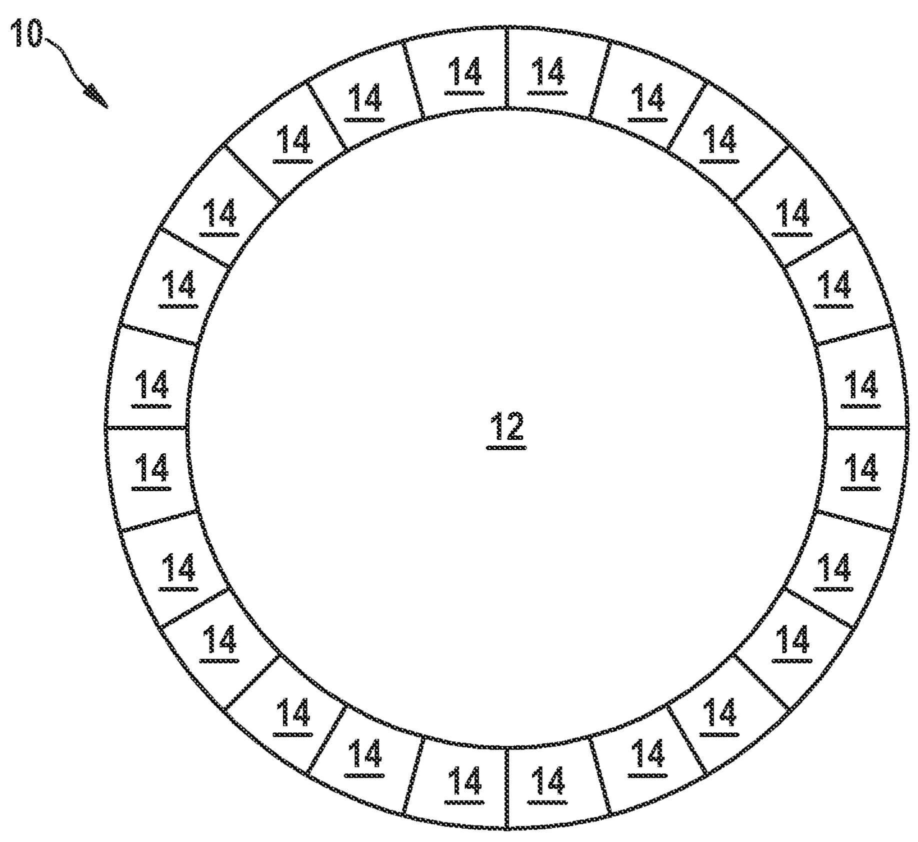
Figure 5B:
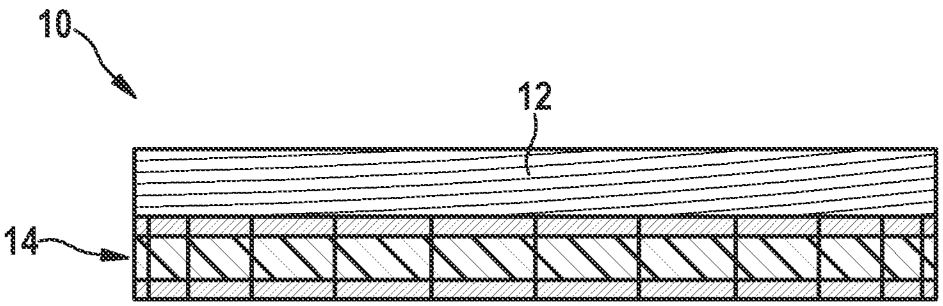

FIG. 5A is a plan view of an arrangement with a hologram and a plurality of polymer sections 14 arranged around the circumference of the hologram 12. The polymer sections 14 can also be arranged beneath the hologram, as shown, for example, in FIG. 5B in a view from the side.

Figure 6A:
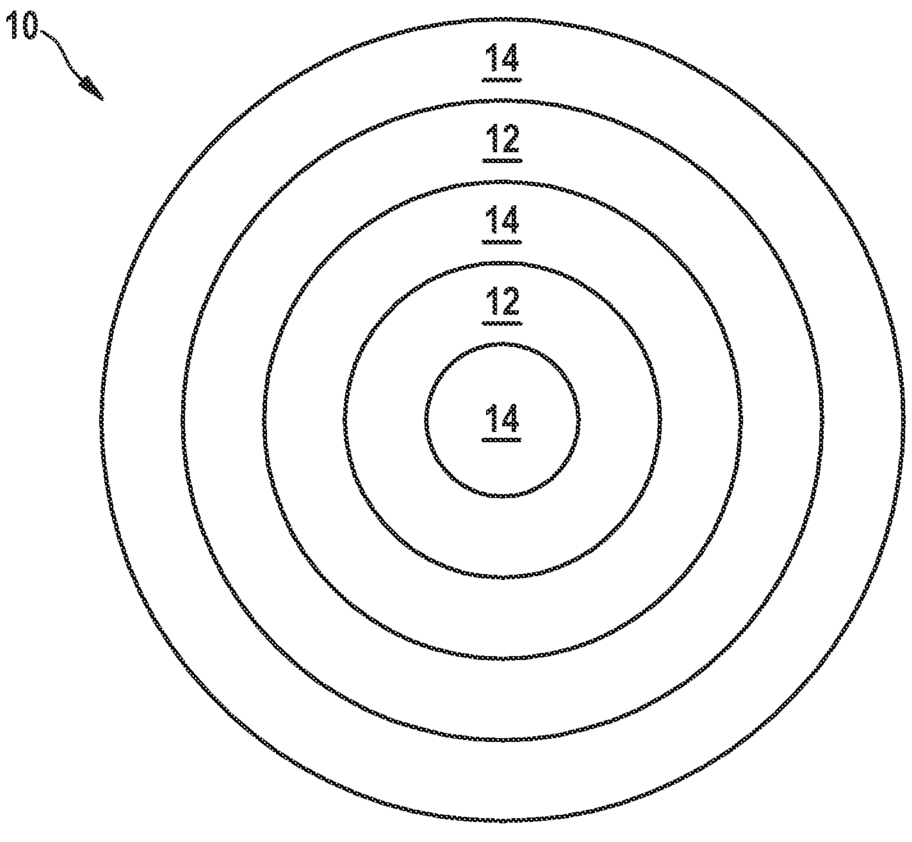
Figure 6B:
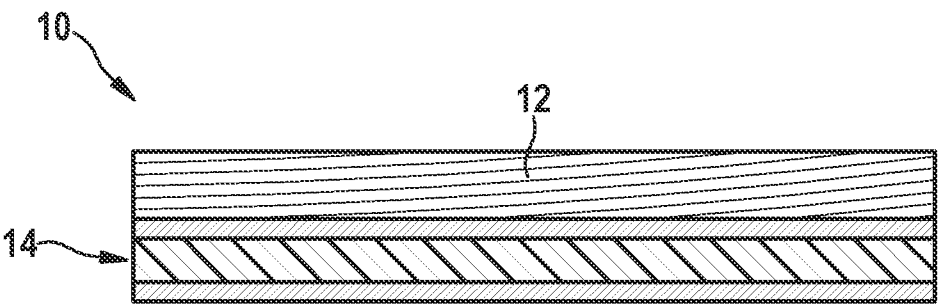

FIG. 6A is a plan view of an arrangement with a plurality of hologram sections 12 and a plurality of arranged polymer sections 14. In the example, the sections are arranged alternatingly in a circular manner around a central hologram section 12. The polymer sections 14 can also be arranged beneath the hologram sections 12, as is shown, for example, in FIG. 6B in a view from the side.

By controlling the electroactive polymer sections 14 in particular individually, the individual holograms or hologram sections 12 can be curved and/or compressed and/or stretched.

The circular arrangement permits a modulation of the playback wavefront of the holographic function, for example in the form of a Zernike polynomial, to different degrees depending on the arrangement and control.

Figure 7:
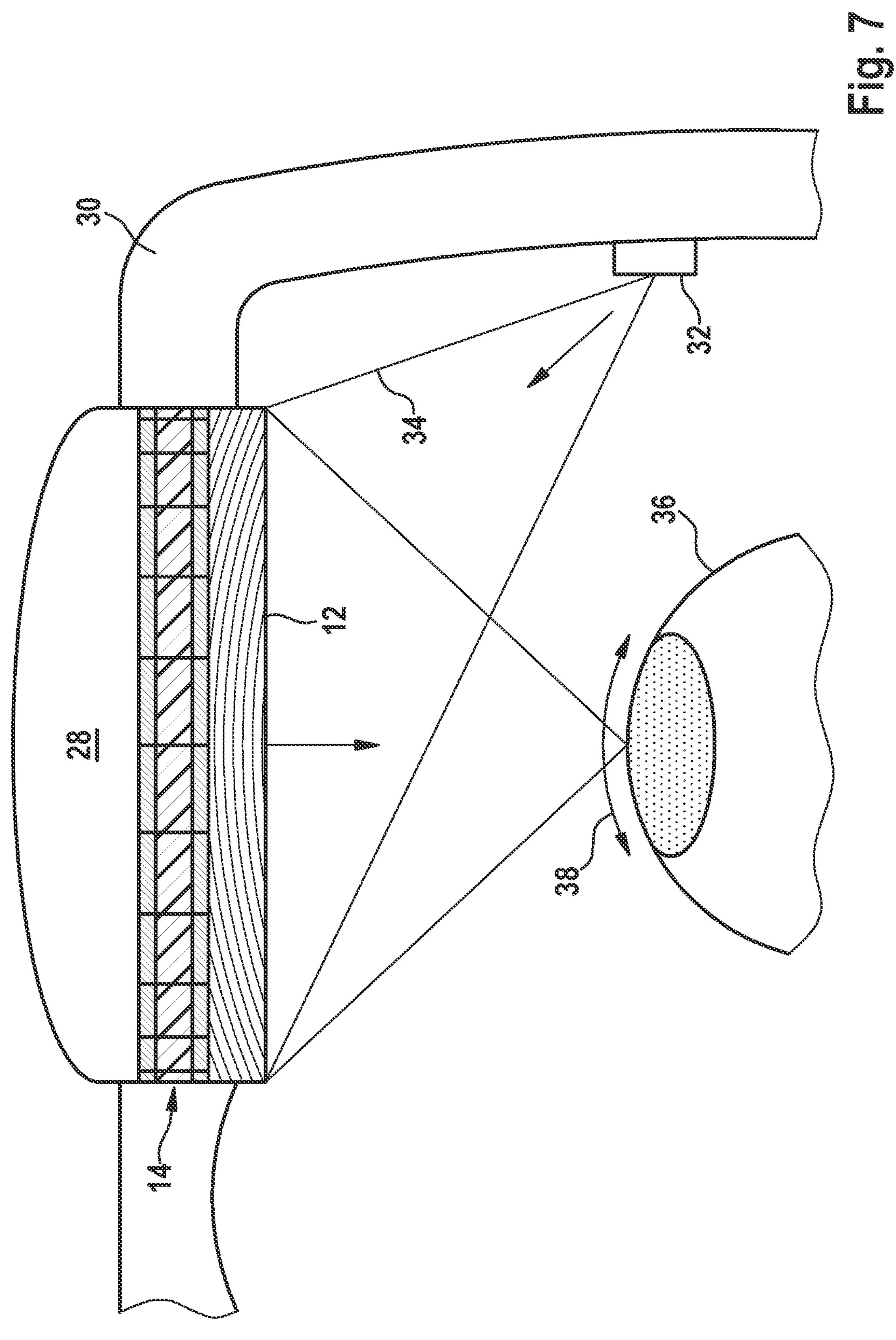
FIG. 7 to FIG. 9 show applications of the holographic optical element according to the present invention according to various embodiments.

FIG. 7 shows a schematic representation of a section of a pair of data glasses. According to the example, a lens 28 and a glasses frame 30 are shown. An array of transparent electroactive polymers 14 and a hologram 12 are embedded in the lens 28 of the glasses. In the example, the image source 32 in the form of a scanning laser 32 is integrated in the glasses frame 30. Alternatively, other image sources 32 such as, for example, a micro-display, SLMs, DLP, etc. could also be used. The laser beam 34 of the scanning laser 32 is deflected at the hologram 12 in such a way that light enters an eye 36 of a user of the glasses and an image can be projected onto the retina of the eye 36. With the aid of the electroactive polymer 14, a position of the image can be shifted laterally, for example along the arrow 38, so that light can be projected into the eye 36 for a large number of different viewing positions or eye positions.

Figure 8:
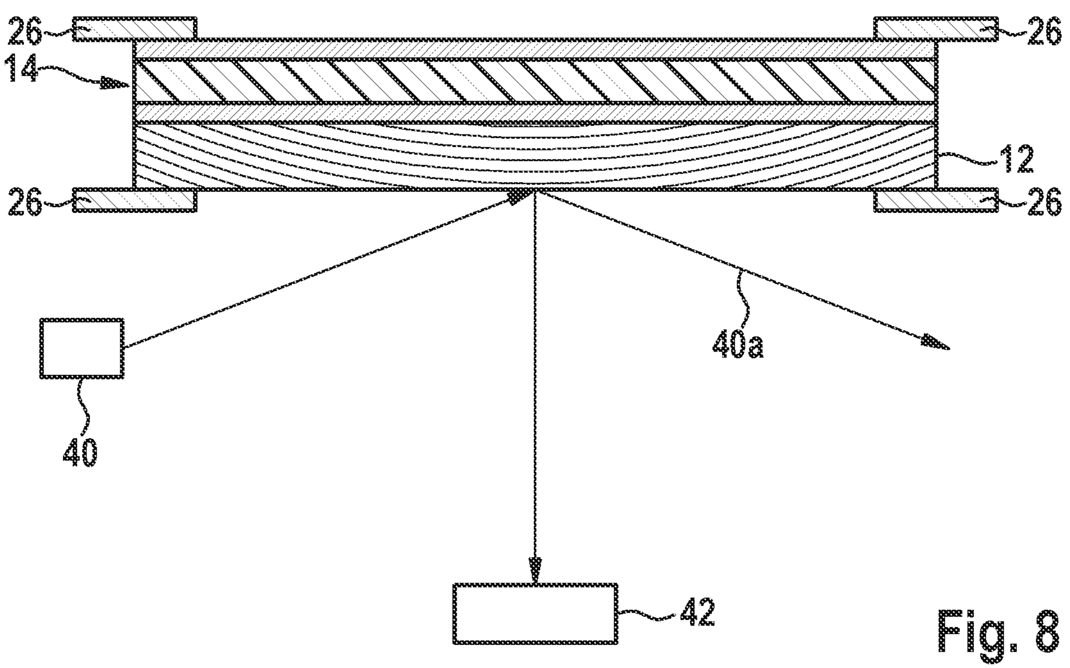

FIG. 8 schematically shows an optical excitation path used in the example for fluorescence-based diagnostics. In the example, a layer stack comprising at least one electroactive polymer 14 and at least one hologram 12 is shown. The layer stack is fastened on both sides, in the example on the right and left as well as at the top and bottom, by a fastening device 26 in order to thus be able to carry out desired mechanical deformations by selective controlling. In the example, a white-light source 40 is used as the excitation source and illuminates the hologram 12 at an angle. A Fresnel component 40*a* of the light emitted by the white-light source 40 is not used for excitation. The hologram 12 diffracts part of the light onto a target 42, in the example a specimen with the sample. The wavelength of the diffracted portion is here dependent on the holographic grating and can be changed with the aid of the electroactive polymer 14 by mechanical deformation, for example stretching and/or compression.

Figure 9:
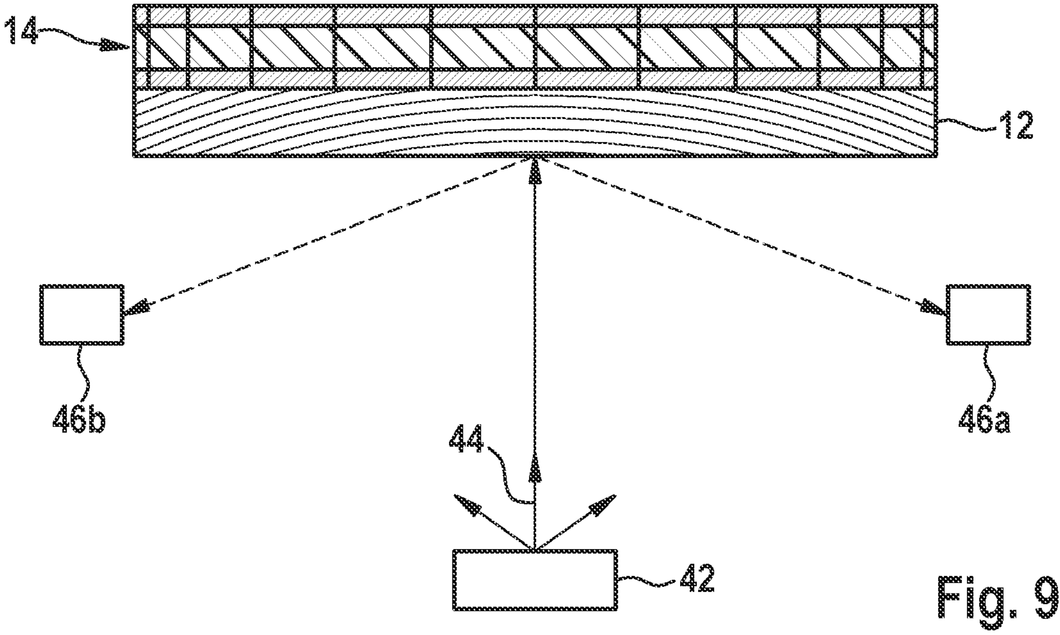

FIG. 9 schematically shows the application of a holographic optical element for detection. A specimen 42 with the sample emits fluorescent light 44 in different directions. At least a portion of the light 44 falls on a layer stack comprising at least one electroactive polymer 14 and at least one hologram 12. The light 44 is deflected by the hologram, wherein a deflection angle can be influenced by controlling the electroactive polymer 14. In the example, the light 44, and also the fluorescence signal, is deflected, for example, in succession, onto dedicated detectors 46*a*, 46*b*. The detectors 46*a*, 46*b* advantageously have a particularly high sensitivity for a specific spectral range.

What is claimed is:

1. A method for producing a holographic optical element (HOE), comprising:

providing at least one hologram with a diffraction grating in a volume of at least one holographic film; and applying the hologram to at least one electroactive polymer (EAP) including a dielectric elastomer actuator (DEA), wherein the electroactive polymer includes at least one elastomer layer arranged between two electrodes, the elastomer layer including an elastomer film, and the hologram is directly affixed to an electrode of the electrodes of the electroactive polymer such that a mechanical deformation of the electroactive polymer causes a corresponding deformation of the hologram.

2. The method according to claim 1, wherein the providing of the hologram includes generating the hologram by introducing the diffraction grating into the volume of the holographic film.

3. The method according to claim 1, wherein a plurality of holograms are applied to a plurality of electroactive polymers, wherein the holograms and electroactive polymers are arranged relative to one another alternatingly in a checkerboard-like or annular form.

4. A holographic optical element (HOE), comprising:

a hologram; and an electroactive polymer (EAP) including a dielectric elastomer actuator (DEA), wherein the electroactive polymer includes at least one elastomer layer arranged between two electrodes, the elastomer layer including an elastomer film, and wherein the hologram is directly affixed to an electrode of the electrodes of the electroactive polymer such that a mechanical deformation of the electroactive polymer causes a corresponding deformation of the hologram, and wherein the hologram or a holographic function which can be provided using the hologram including diffraction properties of the hologram, can be adapted using a controllable deformation of the electroactive polymer.

5. The holographic optical element according to claim 4, wherein the electroactive polymer includes a plurality of independently controllable regions.

6. The holographic optical element according to claim 4, wherein a fastening device is provided on a side of the hologram opposite the electrode of the electroactive polymer to which the hologram is applied, wherein the fastening device provides a counter-support against the deformation of the electroactive polymer that acts on the hologram.

7. The holographic optical element according to claim 4, wherein a plurality of, holograms are applied to a plurality of, electroactive polymers, and the holograms and the electroactive polymers are arranged alternatingly relative to one another, in the manner of a checkerboard or in a circular.

8. The holographic optical element according to claim 4, wherein the holographic optical element includes a layer stack including a plurality of holograms and/or a plurality of electroactive polymers which are arranged stacked.

9. A method for using a holographic optical element, the holographic optical element including:

a hologram, and an electroactive polymer (EAP) including a dielectric elastomer actuator (DEA), wherein the electroactive polymer includes at least one elastomer layer arranged between two electrodes, the elastomer layer including an elastomer film, and wherein the hologram is directly affixed to an electrode of the electrodes of the electroactive polymer such that a mechanical deformation of the electroactive polymer causes a corresponding deformation of the hologram, and wherein the hologram or a holographic function which can be provided using the hologram including diffraction properties of the hologram, can be adapted using a controllable deformation of the electroactive polymer, the method comprising:

controlling the elastomer layer of the electroactive polymer and/or controlling a plurality of independently controllable regions of the elastomer layer of the electroactive polymer, to provide one or more of the following functions in the hologram of the holographic optical element:

a) varying a playback angle of the holographic function of the hologram, b) varying a playback wavelength of the holographic function of the hologram, c) shifting a focal point of the holographic function of the hologram, d) modulating a wavefront of the holographic function of the hologram.

10. A sensor device configured to detect backscattered light, comprising:

at least one optical element including a filter element and/or a deflection element;

wherein the optical element includes a holographic optical element which include:

a hologram, and an electroactive polymer (EAP) including a dielectric elastomer actuator (DEA), wherein the electroactive polymer includes at least one elastomer layer arranged between two electrodes, the elastomer layer including an elastomer film, and wherein the hologram is directly affixed to an electrode of the electrodes of the electroactive polymer such that a mechanical deformation of the electroactive polymer causes a corresponding deformation of the hologram, and wherein the hologram or a holographic function which can be provided using the hologram including diffraction properties of the hologram, can be adapted using a controllable deformation of the electroactive polymer.

11. The sensor device according to claim 10, wherein the sensor device is a lidar sensor, and wherein a deflection angle and/or a wavelength and/or far-field properties of an emitted laser beam can be varied using the holographic optical element.

12. A display device including data glasses or a display, the display device comprising:

at least one optical element, wherein the optical element including a holographic optical element which includes:

a hologram, and an electroactive polymer (EAP) including a dielectric elastomer actuator (DEA), wherein the electroactive polymer includes at least one elastomer layer arranged between two electrodes, the elastomer layer including an elastomer film, and wherein the hologram is directly affixed to an electrode of the electrodes of the electroactive polymer such that a mechanical deformation of the electroactive polymer causes a corresponding deformation of the hologram, and wherein the hologram or a holographic function which can be provided using the hologram including diffraction properties of the hologram, can be adapted using a controllable deformation of the electroactive polymer;

wherein the holographic optical element is configured to provide the holographic function.

* * * * *